D. H. Porter's IMPT IN PIVOTING TEETH.

75192

PATENTED
MAR 3 1868

United States Patent Office.

D. H. PORTER, OF BRIDGEPORT, CONNECTICUT.

Letters Patent No. 75,192, dated March 3, 1868.

---

IMPROVEMENT IN PIVOTING TEETH.

---

The Schedule referred to in these Letters Patent and making part of the same.

---

TO ALL WHOM IT MAY CONCERN:

Be it known that I, D. H. PORTER, of Bridgeport, in the county of Fairfield, and State of Connecticut, have invented a new Improvement in Pivoting Teeth; and I do hereby declare the following, when taken in connection with the accompanying drawings and the letters of reference marked thereon, to be a full, clear, and exact description of the same, and which said drawings constitute part of this specification, and represent, in—

Figure 1:
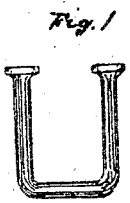

Figure 1, an enlarged view of the double pivot for a single tooth, and in

Figure 2:
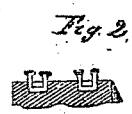

Figure 2 a section of two teeth with the pivot inserted.

This invention relates to an improvement in preparing mineral teeth for attachment to hard-rubber or similar plates, each tooth requiring two pivots; and the invention consists in forming the two pivots from a single piece, heading the two ends, then bend the wire into U-form and insert into the teeth during the process of manufacture, so that the two headed ends project from the teeth the proper distance, and cannot be removed without destroying the teeth.

To enable others to construct my improvement, I will proceed to describe the same as illustrated in the accompanying drawings.

From wire, of the proper size and quality, I cut pieces of the length required for the cross of the U and the two rivets, then head the two ends and bend into the form as seen in fig. 1, and the pivots are finished; then, in the process of manufacture of the teeth, I insert the pivot, as seen in fig. 2, the material of each tooth setting around and over the connection between the two pivots, and thus securing the pivot into the tooth in the most perfect and durable manner, and with much less trouble and saving of time than in the usual method of single rivets.

Having thus fully described my invention, what I claim as new and useful, and desire to secure by Letters Patent, is—

The herein-described double-headed U-rivet, for insertion into mineral teeth, in the manner and for the purpose substantially as herein set forth.

D. H. PORTER.

Witnesses:
C. D. PORTER,
EDWARD H. LYON.